United States Patent [19]
Fukatsu et al.

[11] Patent Number: 5,146,334
[45] Date of Patent: Sep. 8, 1992

[54] VIDEO SIGNAL PROCESSING DEVICE FOR IMAGE EDITING USING MEMORY

[75] Inventors: Tsutomu Fukatsu, Kanagawa; Tadayoshi Nakayama, Tokyo; Yoshihiro Nakatani, Kanagawa; Hisataka Hirose, Kanagawa; Chikara Sato, Kanagawa; Kenichi Nagasawa, Kanagawa, all of Japan

[73] Assignee: Canon Kabushiki Kaisha, Tokyo, Japan

[21] Appl. No.: 481,982

[22] Filed: Feb. 20, 1990

[30] Foreign Application Priority Data

Feb. 27, 1989 [JP] Japan .................................. 1-45794
Feb. 28, 1989 [JP] Japan .................................. 1-48903
Feb. 28, 1989 [JP] Japan .................................. 1-48911

[51] Int. Cl.$^5$ ..................... H04N 5/262; H04N 5/272; H04N 9/74
[52] U.S. Cl. ..................... 358/183; 358/22; 358/182; 358/167
[58] Field of Search ................. 358/160, 167, 22, 36, 358/37, 180, 182, 183, 32, 105, 181, 209, 906

[56] References Cited

U.S. PATENT DOCUMENTS

| | | | |
|---|---|---|---|
| 4,163,249 | 7/1979 | Michael et al. | 358/21 R |
| 4,768,095 | 8/1988 | Wada et al. | 358/183 |
| 4,779,135 | 10/1988 | Judd | 358/183 |
| 4,841,366 | 6/1989 | Katagiri et al. | 358/167 |
| 4,994,900 | 2/1991 | Ebara et al. | 358/31 |

Primary Examiner—James J. Groody
Assistant Examiner—Safet Metjahic
Attorney, Agent, or Firm—Robin, Blecker, Daley & Driscoll

[57] ABSTRACT

A video signal processing device is arranged to obtain a signal representing a difference between an input video signal and a signal read out from a memory to which either the input video signal or an input video signal is supplied, to supply the difference signal to a multiplier which uses a variable coefficient, and to add the output of the multiplier to the input video signal.

19 Claims, 8 Drawing Sheets

VIDEO SIGNAL PROCESSING DEVICE FOR IMAGE EDITING USING MEMORY

BACKGROUND OF THE INVENTION

1. Field of the Invention

This invention relates to a video signal processing device and more particularly to a video signal processing device having a memory which is capable of temporarily storing a video signal.

2. Description of the Related Art

The art of processing a video signal by using a memory includes a process for suppressing noises by forming a video signal which is delayed by one field or one frame; and a special effect process for obtaining a wiping or fading effect between a video signal stored in the memory and a normal input video signal.

In the field of business video apparatuses, it has been practiced to give special composite or synthetic pictures by combining a plurality of video signals. Meanwhile, such special composite pictures have recently come to be desired also for a home video apparatus.

For example, special image effects attainable by the camera-integrated type VTR which has recently become popular can be further diversified with the wipe- or fade-effect attaining process combined with the above-stated composite image attaining process. Further, insertion of a border line in between picture components of a composite picture or insertion of a color back in a vacant part of an image would make a picture much clearer.

Further, while it is conceivable to singly appreciate an enlarged picture by using a memory, such a picture would become more interesting when combined with other pictures. Further, application of the wipe- or fade-effect process to such an enlarged picture in combination would further diversify the available special image effects.

In actuality, however, home video apparatuses are generally not arranged to be capable of performing the above-stated special processes, because:

The above-stated video signal processes and the circuit designs for them have been individually formed. An attempt to consolidate them would require use of a vary large number of memories and a highly complex circuit arrangement. In other words, in order to carry out every one of these processes, the VTR must be provided with many circuits including processing circuits for suppressing noises, for combining images and for obtaining the wiping and fading effects; a designation circuit for determining an image combining pattern in obtaining a composite image; a processing circuit for enlarging an image; and a circuit for inserting a border line in between pictures. As a result, circuits must be arranged on a very large scale.

Further, in a home VTR, these processes must be simply accomplished. However, they require complex instructions for designating an image combining pattern, a border line generating position, etc. Generally, it is too toilsome for home VTR operators to give such complex instructions.

SUMMARY OF THE INVENTION

It is, therefore, a general object of this invention to solve the above-stated problem.

It is a more specific object of the invention to provide a video signal processing device which is arranged to combine by means of a simple circuit arrangement an input image with an image which is processed through a memory.

Under this object, a video signal processing device which is arranged according to this invention as an embodiment thereof comprises: memory means which is arranged to receive a first video signal and to be capable of storing at least one picture amount of the video signal; subtracting means for forming a video signal representing a difference between a video signal output from the memory means and a second video signal; multiplying means which is arranged to receive the video signal output from the subtracting means and to multiply the video signal by a variable coefficient; and adding means for adding together a video signal output from the multiplying means and the second video signal.

It is another object of this invention to provide a video signal processing device which is arranged to be capable of performing both a noise suppressing process and an image combining process by means of a simple circuit arrangement.

Under that object, a video signal processing device arranged according to this invention as another embodiment thereof comprises: Memory means arranged to receive a first video signal and to have a memory which is capable of storing an "n" picture amount of a video signal, "n" representing an integer which is at least 1; subtracting means for forming a video signal representing a difference between a video signal output from the memory means and a second video signal; multiplying means arranged to receive the video signal output from the subtracting means and to multiply the video signal by a variable coefficient; non-linear processing means for subjecting the video signal output from the subtracting means to a non-linear processing operation; switching means for selectively outputting a signal output from the non-linear processing means or a signal output from the multiplying means; and adding means for adding together the video signal output from the switching means and the second video signal.

These and other objects and features of this invention will become apparent from the following detailed description of embodiments thereof taken in connection with the accompanying drawings.

DETAILED DESCRIPTION OF THE PREFERRED EMBODIMENTS

Figure 1:
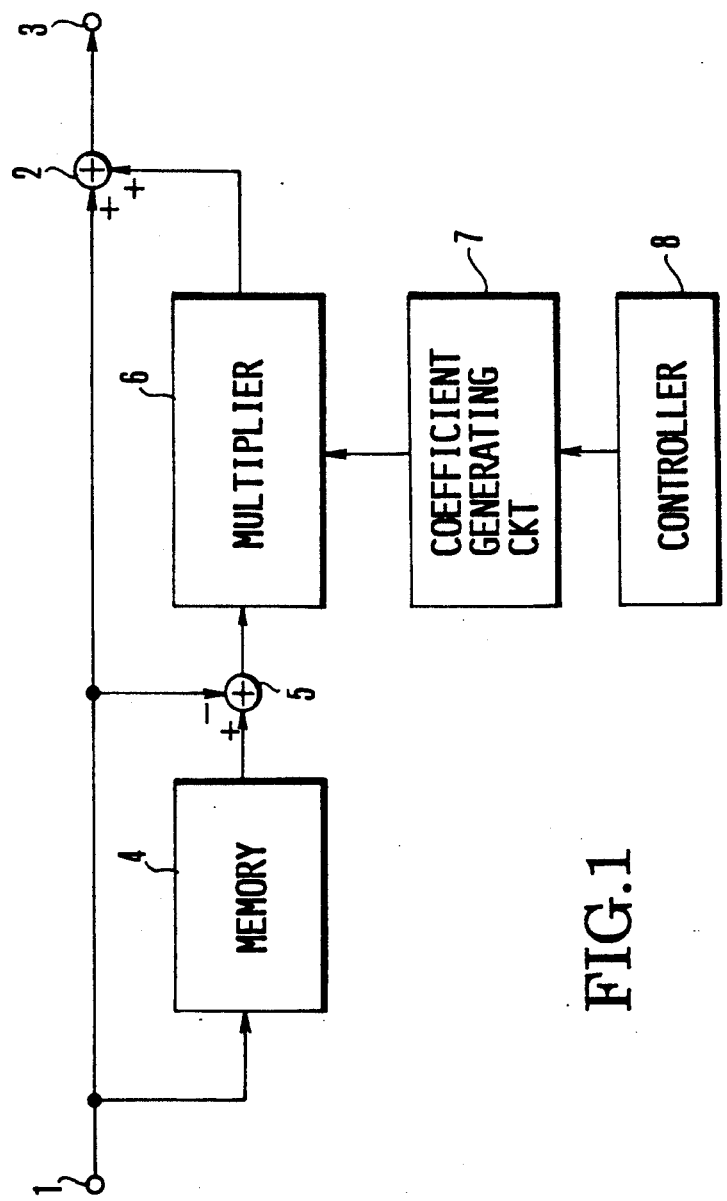
FIG. 1 is a block diagram showing the essential parts of a video signal processing device arranged according to this invention as an embodiment thereof.

Embodiments of this invention are described below with reference to the drawings:

A video signal processing device which embodies this invention is arranged as shown in FIG. 1. An input terminal 1 is arranged to receive a digital video signal which is obtained by digitizing a signal, etc., reproduced by a VTR. All the component elements shown in FIG. 1 are arranged to handle digital signals each of which consists of a plurality of bits.

In a case where the processing circuit of FIG. 1 is to be used for a still image reproducing operation of the VTR, the device operates as follows: The video signal received at the input terminal 1 is supplied to a memory 4 which has a capacity for one field amount of the video signal. Assuming that the process of writing the input video signal into the memory 4 is brought to a stop when an instruction is given for reproduction of a still image, one and the same picture is repeatedly read out from the memory 4. The output signal of the memory 4 thus obtained is supplied to a subtracter 5. The subtracter 5 subtracts the input video signal from the output signal of the memory 4. The output of the subtracter 5 is supplied to a multiplier 6. The multiplier 6 is arranged to use a coefficient controlled by coefficient data DK output from a coefficient generating circuit 7 under the control of a system controller 8. In the case of still picture reproduction, this coefficient data DK remains at "1". As a result, the output of the multiplier 6 in this case becomes equal to the output of the subtracter 5. The output of the multiplier 6 is supplied to an adder 2. At the adder 2, an input signal component is offset. As a result, the still image signal which is obtained from the memory 4 is output from an output terminal 3.

A composite video signal for a picture, a part of which is formed by the stored still picture and the rest by the input video signal, can be obtained by changing the value of the coefficient data DK for the multiplier 6 between "0" and "1" in synchronism with a horizontal synchronizing (hereinafter referred to as sync) signal HD and a vertical sync signal VD under this condition. Further, by setting the coefficient data DK at "½", for example, a composite video signal for a multiple picture consisting of the stored still image and a motion image formed by the input video signal can be obtained. Further, one picture can be changed over to another in a wipe-effect attaining manner by varying with time the timing of change-over of the coefficient data DK between "0" and "1." Further, one picture can be changed over to another in a fade-effect attaining manner by varying the value of the coefficient data DK with time from "0" to "1" and vice versa.

Figure 2:
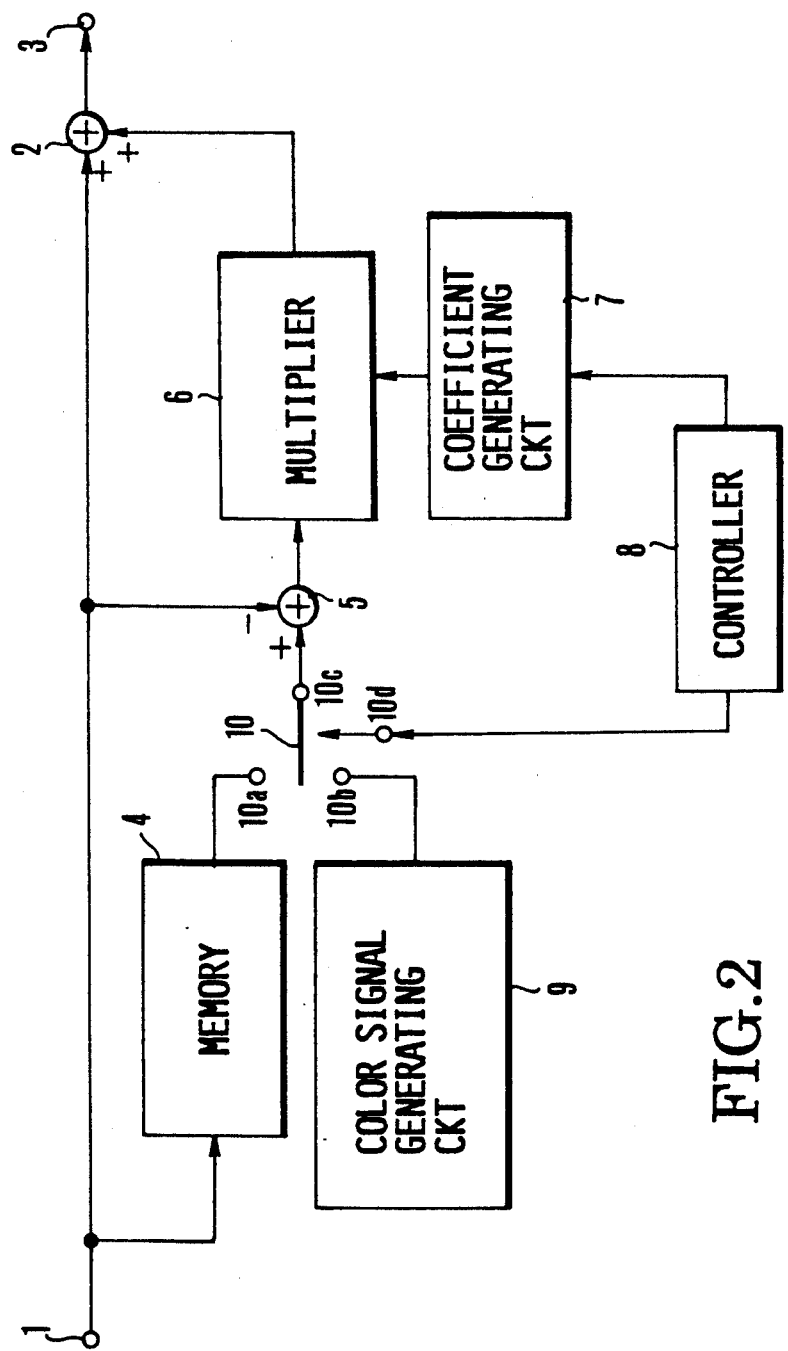
FIG. 2 is a block diagram showing the essential parts of a video signal processing device arranged as another embodiment of the invention.

A second embodiment of the invention is arranged as described below with reference to FIG. 2:

In FIG. 2, the component parts similar to those of FIG. 1 are indicated by the same reference numerals and the details of them are omitted from the description. Referring to FIG. 2, a color signal generating circuit 9 is arranged to continuously generate a color video signal of a given luminance level, a given degree of saturation and a given hue. A switching circuit 10 is arranged to selectively supply a subtracter 5 with the output of a memory 4 or the color signal generating circuit 9 in accordance with a control signal output from a system controller 8. The system controller 8 is arranged to correlate the switching action of the switching circuit 10 with a coefficient data which is supplied to a multiplier 6 as will be further described later.

In inserting a color border line, the second embodiment which is arranged as described above operates as follows: Assuming that the coefficient data is at "1" during a first half of each horizontal scanning period and at "0" during the latter half of the period, a video signal which is output from the output terminal 3 is a composite video signal having the right half of its picture correspond to an input video signal and the left half of the picture to a video signal output from the memory 4, as apparent from the foregoing description with reference to FIG. 1.

In the case of inserting a border line, the connecting position of the switching circuit 10 is shifted from a switch terminal 10a to a terminal 10b a given period of time before the coefficient data is changed from "1" to "0" during each horizontal scanning period and is brought back from the terminal 10b to the terminal 10a immediately before the beginning of each horizontal scanning period. In this instance, the width of a color border line to be inserted becomes thick if the given period of time is long and fine if this period is short. In other words, the coefficient data control timing and the switching timing of the switching circuit 10 are thus interrelated with each other by the system controller 8.

As mentioned in the foregoing, one picture can be changed over to another in a wiping manner by changing with time the value of the coefficient data between "0" and "1". In this instance, the switching timing of the switching circuit 10 is also changed with time. A color border line can be easily inserted also during such a wipe-effect attaining process by interrelating the timing of control over the coefficient data and the switching timing of the switch circuit 10 by the system controller 8.

Generally, in forming a composite image by providing a vertical border line between images, the connecting position of the switching circuit 10 is shifted from the terminal 10a to the terminal 10b a given period (about 1/10 to 1/20 of the horizontal scanning period) before the change-over of the coefficient data from "1" to "0". After that, the position of the switching circuit 10 is shifted from the terminal 10b back to the terminal 10a a given period after the change-over of the coefficient data from "0" to "1". Further, in obtaining a composite image by providing a horizontal border line between images, the connecting position of the switching circuit 10 is shifted from the terminal 10a to the terminal 10b at a point of time preceding, by a given number (10 to 20) of scanning lines, the change-over of the coefficient data from "1" to "0" and from the terminal 10b back to the terminal 10a by a given number of scanning lines after the change-over of the coefficient data from "0" to "1".

Further, in the operation described above, if the position of the switching circuit 10 is kept on the side of the terminal 10b, a picture corresponding to the input video signal can be combined with a color back picture. Application of this process in combination with the wipe-effect attaining process described above gives a greater effect.

In accordance with the arrangement of the embodiment described, images can be variously combined in various patterns. In addition to that, a color border line and a color back can be inserted by a very simple operation to attain a greater effect. Further, the embodiment obviates the necessity of use of additional processing circuits for insertion of a color border line and a color back. The circuit arrangement can be simplified to a great degree. The embodiment enables a home video apparatus to perform a signal processing operation in a highly sophisticated manner.

In the first and second embodiments described above with reference to FIGS. 1 and 2, the still image producing function of the memory 4 is alone described for the sake of simplified illustration. However, the memory can be arranged to have also some other functions. For example, an image enlarging function or the like can be easily added to the function of the memory 4. In that case, a color border line of course can be inserted in between an enlarged image part and a normal image part. Further, in the case of the first and second embodiments, the signal input to memory 4 is described to be a video signal. However, the same advantageous effect is attainable by arranging a video signal output from the adder 2 to be supplied to the memory 4.

The arrangement of the video signal processing device (the second embodiment) shown in FIG. 2 permits simplification of circuit arrangement and, in combining images, a border line can be inserted in between pictures by a simple operation.

Figure 3:
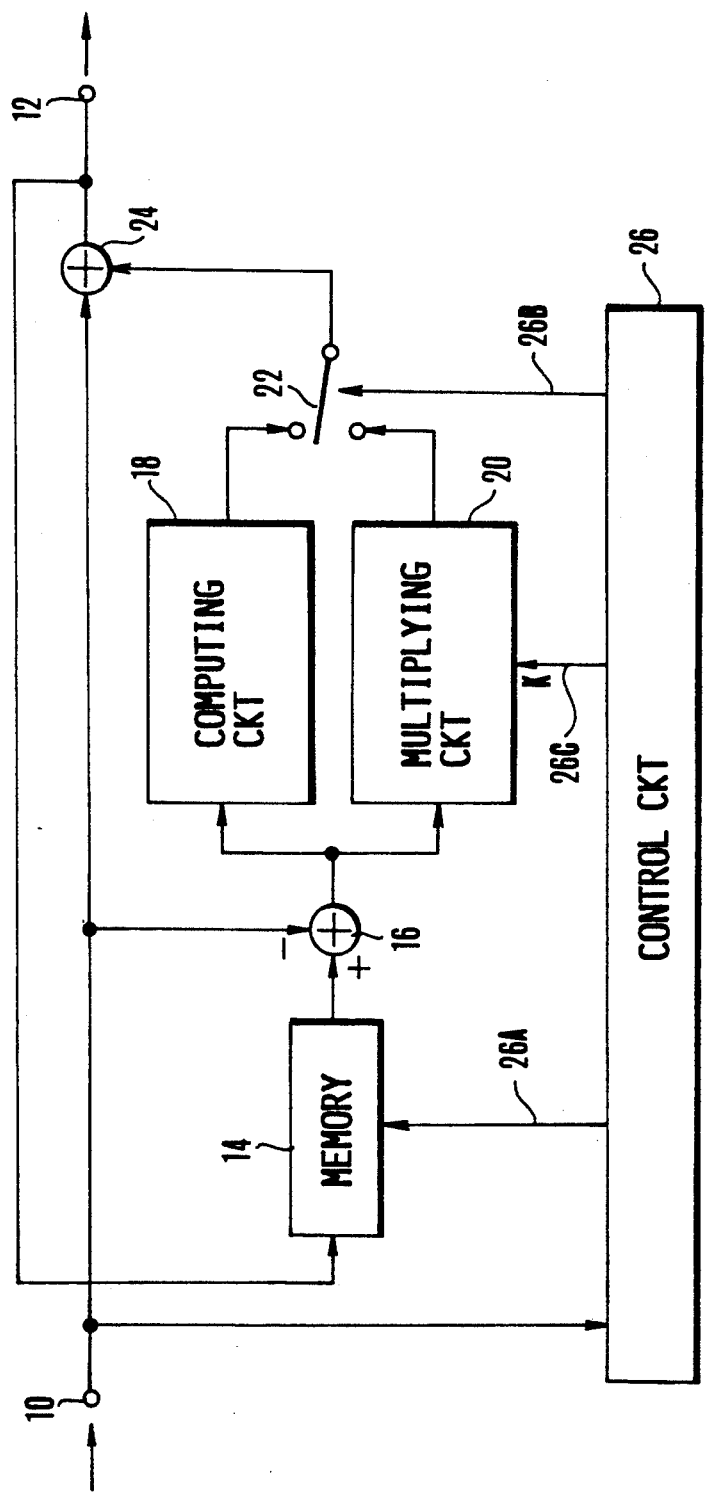
FIG. 3 is a block diagram showing the essential parts of a video signal processing device arranged as a further embodiment of the invention.

FIG. 3 shows in a block diagram the arrangement of a third embodiment of this invention. The third embodiment is described as follows: An input terminal 10 is arranged to receive video data which has been sampled, quantized and encoded by an A/D converter (not shown). An output terminal 12 is arranged to output the video data after processing by the circuits shown. A memory 14 has a predetermined storage capacity. A reference numeral 16 denotes a subtraction circuit. A computing circuit 18 is arranged to functionally consist of a limiter and a multiplier which multiplies the output of the limiter by a given multiplier and to perform a computing operation as will be described later. A multiplying circuit 20 is arranged to perform a linear multiplying operation. A numeral 22 denotes a change-over switch. A numeral 24 denotes an addition circuit. A control circuit 26 is arranged to control the operations and operation timing of the above-stated component parts.

The control circuit 26 produces an output 26A which is a control signal for controlling writing and reading into and out of the memory 14, an output 26B which is a control signal for controlling the operation of the switch 22, and another output 26C which is multiplication data supplied to the multiplying circuit 20.

In attaining the wipe and fade effects mentioned in the foregoing, the third embodiment operates as follows: A video signal corresponding to a desired picture is first written into the memory 14. This is accomplished by validating the memory writing control signal 26A of the control circuit 26 for the period of time during which the desired video signal is supplied to the memory 14. At this time, the connecting position of the switch 22 is shifted to the output side of the multiplying circuit 20 by the control signal 26B; and the multiplication data K which is supplied to the multiplying circuit 20 is set at zero. By this, the input video data which is received at the input terminal 10 is allowed to be stored in the memory 14 as it is.

Next, in synchronism with the video data coming to the input terminal 10, the stored data of the memory 14 is repeatedly read out. The subtraction circuit 16 subtracts the input data to the input terminal 10 from the data obtained from the memory 14. The output of the subtraction circuit 16 thus obtained is applied to the multiplying circuit 20. The multiplying circuit 20 multiplies the output of the subtraction circuit 16 by the multiplication data 26C. The result of multiplication is applied to the addition circuit 24. The input data from the input terminal 10 is again added to the output of the multiplying circuit 20. The output of the addition circuit 24 is produced from the output terminal 12.

When the multiplication data 26C is at zero, the data output from the output terminal 12 is the same as the input data from the input terminal 10. If the data 26C is at "1", the video data stored at the memory 14 is supplied to the output terminal 12 as it is. If the multiplication data 26C is at a value K which is larger than 0 and less than 1, the video data from the input terminal 10 and the video data from the memory 14 are mixed in a ratio corresponding to the multiplier K and the mixed video data thus obtained is supplied to the output terminal 12. The fading effect is attained by gradually and simply increasing or decreasing the multiplier K. The wiping effect is attained by increasing or decreasing a length of time of delay from horizontal and vertical sync signals and by changing the multiplier K to a great degree, such as changing it to 0 or 1, at the timing delayed from the sync signal.

In suppressing noises by utilizing the correlativity of the video signal, the third embodiment operates as follows: In the initial setting stage of operation, writing and reading into and out of the memory 14 are set to be constantly enabled by the memory control signal 26A. This enables the memory 14 to serve as a delay element for delaying a given period of time (for one field period, in this instance). The position of the switch 22 is set on the output side of the computing circuit 18.

Like in the case of the wipe- or fade-effect attaining process, data representing a difference between the data from the memory 14 and the input data from the input terminal 10 is supplied to the computing circuit 18. The input data to the computing circuit 18 represents an image part having no correlativity, that is, it consists of movement and noise components of an image. In a case where the computing circuit 18 is a multiplier arranged to multiply the input data by a given multiplier, the circuit shown in FIG. 3 serves as a low-pass filter. Then, the movement component of the image would be lost as well as the noise component through this circuit. To prevent this, therefore, the computing circuit 18 is provided with a limiter which is disposed before the multiplier. In the event of a large difference signal input to the computing circuit 18, its cyclic effect is lowered to prevent the movement component from being readily lost.

The output of the computing circuit 18 is applied to the addition circuit 24 in the same manner as in the case of the wipe- or fade-effect attaining process. The output of the circuit 18 is thus added to the input data from the input terminal 10. The result of addition is supplied to the output terminal 12. As a result, only the noise component is removed from the video data supplied to the input terminal 10. The video data output from the output terminal 12 is, therefore, free from noises.

In the case of the third embodiment shown in FIG. 3, the memory 14 is arranged to receive the video signal from the adder 24. However, the same advantageous effect is likewise attainable by changing this arrangement to supply the memory 14 with the video signal from the input terminal 10 like in the cases of the first and second embodiments shown in FIGS. 1 and 2.

The arrangement of the third embodiment as shown in FIG. 3 thus enables a circuit which is normally used for noise reduction to be utilized for combining images and for attaining the special effects with very simple circuit arrangement.

Figure 4:
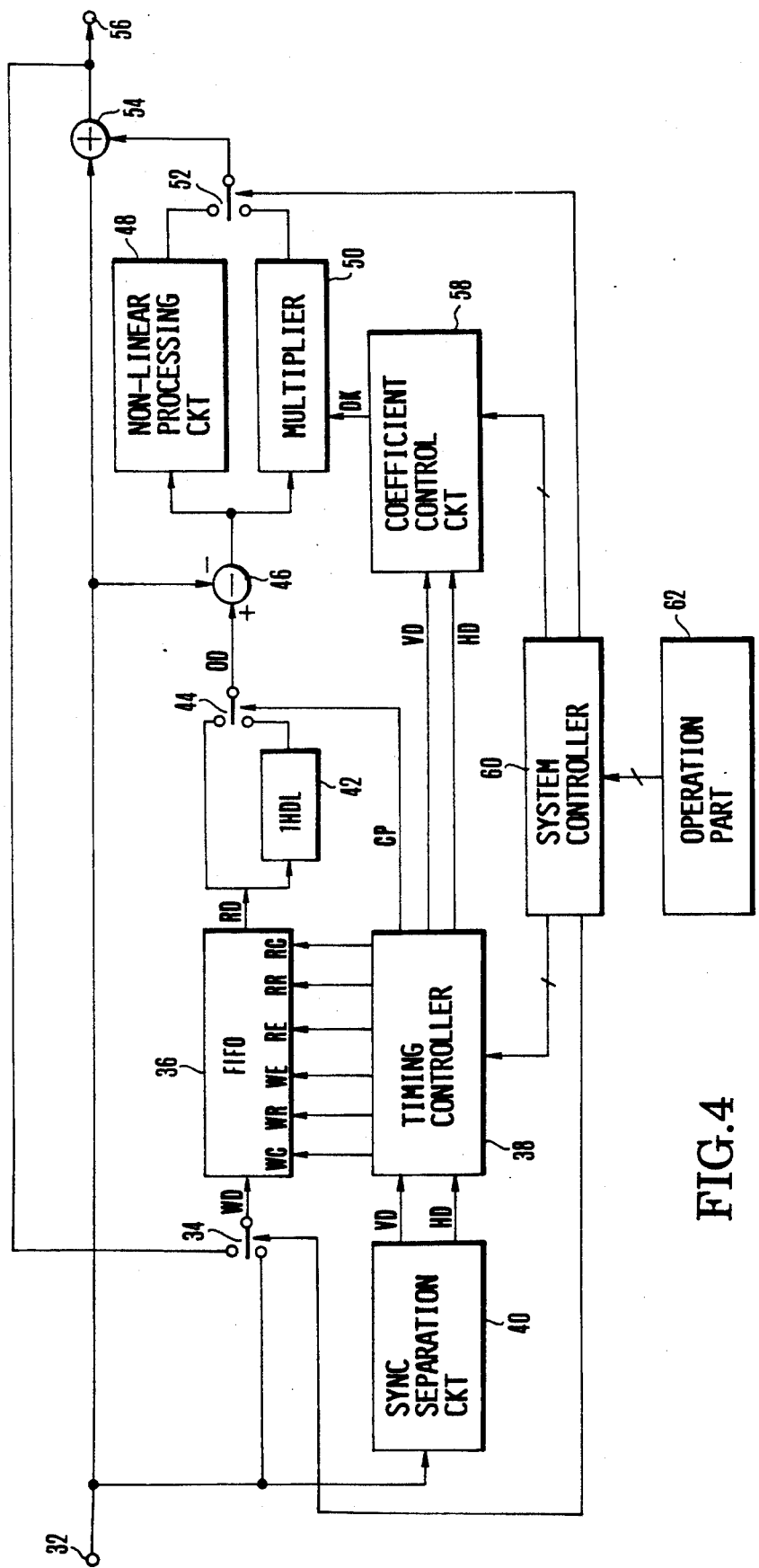
FIG. 4 is a block diagram showing the essential parts of a video signal processing device arranged as a still further embodiment of the invention.

FIG. 4 is a block diagram showing the arrangement of a video signal processing device which is arranged as a fourth embodiment of the invention. Referring to FIG. 4, the fourth embodiment is arranged as follows: An input terminal 32 receives a digital video signal which is obtained by digitizing a reproduced signal or the like obtained from a VTR. Each of the component parts shown in FIG. 4 is arranged to handle a digital signal consisting of a plurality of bits.

The normal operation, i.e., the noise reducing operation, of the video signal processing device of FIG. 4 is first described as follows: In this instance, the connecting position of a switch 34 is shifted to one side thereof on the side of an output terminal 56 by a control signal output from a system controller 60 in response to an operation performed on an operation part 62. A video signal supplied to the output terminal 56 is also supplied as writing data WD to a first-in/first-out (FIFO) memory 36 which has a capacity for one field amount of the video signal. The FIFO memory 36 constantly performs writing and reading. The writing address reset timing of the memory is set immediately after the reading address reset timing. The FIFO memory 36 thus serves as one field delay circuit.

Further, a timing controller 38 which is controlled by a system controller 60 produces a control pulse signal CP. The control pulse signal CP is supplied to a switch 44 to cause the switch 44 to constantly supply a subtracter 46 with the output of the FIFO memory 36 obtained without passing through a one-horizontal-scanning period delay line (1HDL) 42. The subtracter 46 is arranged to obtain a difference between this input video signal and a previous video signal obtained one field period before. A signal representing the sum of noise component and a movement component is thus obtained.

The connecting position of a switch 52 is set on the side of a non-linear processing circuit 48 by the system controller 60. This allows the output of the non-linear processing circuit 48 to be supplied to an adder 54. The non-linear processing circuit 48 is arranged to multiply this input by a given coefficient K (less than 1 and larger than 0) when the level of the input is below a given value and to produce a value which corresponds to the given value when the input level is above the given value. The non-linear processing circuit 48 has the coefficient set at a value close to "1" and is arranged in such a manner that a noise component which is below the given value is allowed to be produced while a component corresponding to an image movement which is above the given value is not allowed to be produced. Therefore, the video signal output from the adder 54 becomes a signal which is obtained by subtracting only the noise component from the video signal coming through the input terminal 32.

Next, in a case where a still picture is to be reproduced by the VTR, the video signal processing circuit arrangement of FIG. 4 operates as follows: In this case, writing into the FIFO memory 36 comes to a stop when an instruction for still picture reproduction is given. As a result, the video signal for one and the same picture is repeatedly read out from the FIFO memory 36. The switch 44 then supplies the output of the FIFO memory 36 which comes without passing through the 1HDL 42 to the subtracter 46. The connecting position of the switch 52 is set on the side of a multiplier 50. The coefficient of the multiplier 50 is controlled by coefficient data DK which is output from a coefficient control circuit 58 under the control of the system controller 60. In the case of still picture reproduction, the coefficient data DK is always set at "1" to make the output of the multiplier 50 equal to that of the subtracter 46. Therefore, at the adder 54, the input signal component is offset. As a result, a still image signal which comes from the FIFO memory 36 is output from the output terminal 56.

Under this condition, if the value of the coefficient data DK is changed between "0" and "1" in synchronism with the timing of a horizontal sync signal (HD) and a vertical sync signal (VD) coming from the timing controller 38, a composite (or synthetic) video signal can be obtained to give a composite picture consisting of a still picture which is obtained from the data stored by the memory and a motion picture which is obtained from the input video signal. Further, if the coefficient data DK is set at "½", a composite video signal can be obtained to give a multiple picture consisting of a still picture stored and a motion picture obtained from the input video signal. Further, one picture can be changed over to another with the wiping effect by changing the value of the coefficient data DK between "0" and "1" with time. One picture can be changed over to another with the fading effect by causing the coefficient data DK to change with time from "0" to "1" and vice versa.

Figure 5:
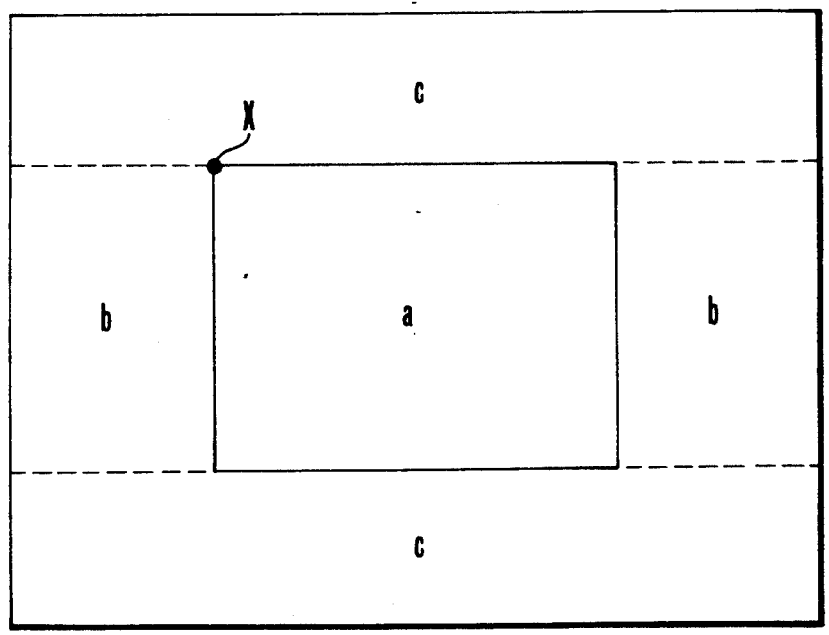
FIG. 5 is a schematic view showing an enlarging process performed by the processing device of FIG. 4.
Figure 6:
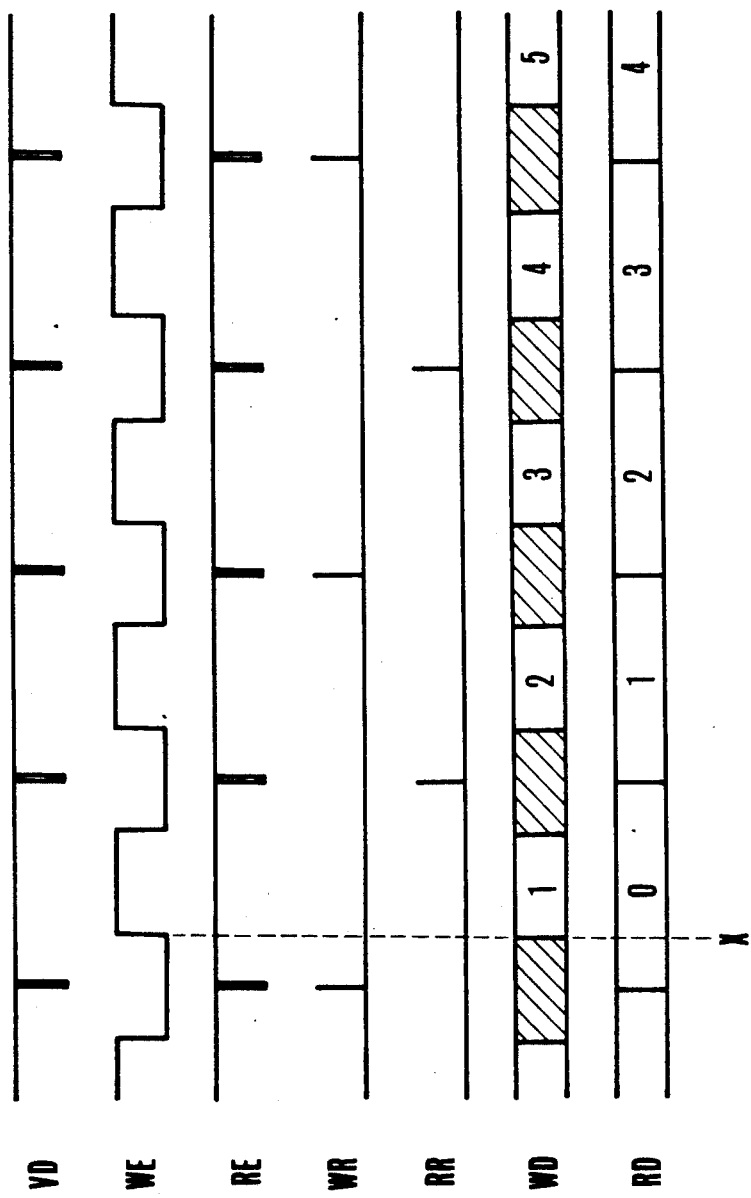
FIGS. 6 and 7 are timing charts respectively showing the actions of various parts of the device of FIG. 4.
Figure 7:
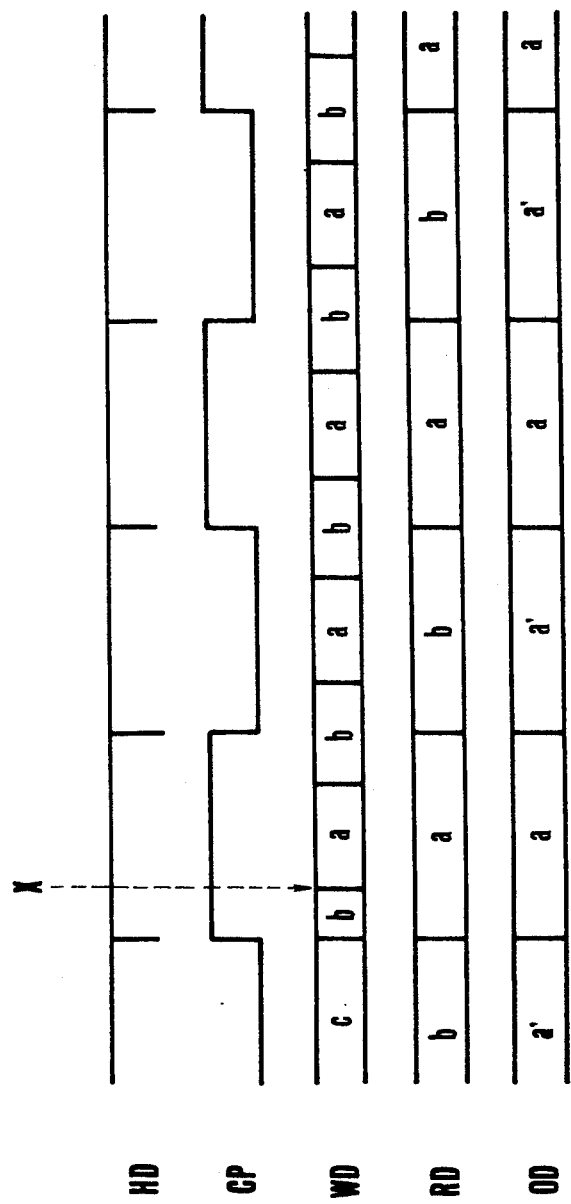

In enlarging an image, in combining the enlarged image with other images and in performing the wipe- or fade-effect attaining process, the fourth embodiment operates in the following manner:

FIG. 5 schematically shows the above-stated processes. FIGS. 6 and 7 show the timing of the process of the FIFO memory 36 in enlarging an image. FIG. 6 shows the timing of vertical scanning and FIG. 7 the timing of horizontal scanning.

The sync separation circuit 40 is arranged to separate the vertical sync signal VD and the horizontal sync signal HD from the input signal coming from the input terminal 32. The timing of the control signals output from the timing controller 38 is determined by these sync signals VD and HD.

Referring to FIG. 6, a reference symbol VD denotes the vertical sync signal. A symbol WE denotes a writing enable signal for enabling writing into the FIFO memory 36. A symbol RE denotes a reading enable signal for enabling reading from the memory 36. A symbol WR denotes a writing reset signal. A symbol RR denotes a reading reset signal. A symbol WD denotes writing data. A symbol RD denotes reading data.

Referring to FIG. 5, an area "a" part of FIG. 5 is assumed to be enlarged. The writing enable signal WE is, as shown in FIG. 6, at a high level (H) permitting to write during periods which correspond to areas "a" and "b" of FIG. 5 and is at a low level (L), which inhibits writing, during all other periods. Only the video signal parts that correspond to these areas "a" and "b" are allowed to be written into the FIFO memory 36. More specifically, the level of this writing enable signal WE becomes high when scanning comes to a point X of FIG. 5 and becomes low ½ field period after that point. The timing of change of the writing enable signal WE to a high level is also indicated by a time point X in each of FIGS. 6 and 7. The writing reset signal WR is arranged to give a pulse once in two field periods while the writing enable signal WE is at a low level (in synchronism with the vertical sync signal in the case of FIG. 6). A writing clock signal WC which is used for writing into the FIFO memory 36 is arranged to be exactly the same as in the case of the noise reducing operation. With the FIFO memory 36 assumed to have a storage capacity for one field amount of a video signal, a two-field amount of video signal data corresponding to the above-stated areas "a" and "b" is written in the FIFO memory 36 during the period of two fields. At a part schematically showing the writing data WD in FIG. 6, numerals represent filled numbers while hatched parts represent periods having no writing data. Further, at a part schematically illustrating the writing data WD in FIG. 7, symbols "a", "b" and "c" denote video signal data corresponding to the areas "a", "b" and "c" of FIG. 5 respectively.

In this instance, a reading clock signal RC is set at a frequency which is ½ of the writing clock signal WC. Therefore, during the two-field period, the two-field amount of data is read out from the FIFO memory 36 in a state of being time-base expanded by two times. Since the reading clock frequency is ½ of the writing clock frequency, the reading enable signal RE must be arranged to be at a high level for a period of time two times as long as the high level period of the writing enable signal WE. Therefore, the reading enable signal RE is always at a high level with the exception of the vertical sync period. The reading reset signal RR has a pulse at a timing of operating the left upper end part of FIG. 5 in synchronism with the vertical sync signal once in a two-field period. In accordance with the signal RR, reading data RD is obtained in a state as schematically shown at the parts RD in FIGS. 6 and 7. In other words, in reading the data out from the FIFO memory 36, only the scanning lines scanning the areas "a" and "b" are time-base expanded by two times; and a video signal part corresponding to the area "a" and another video signal part corresponding to the area "b" are alternately included in the data read out for every horizontal scanning period.

In FIG. 7, a reference symbol CP denotes a control pulse signal supplied from the timing controller 38 to the switch 44. The control pulse signal CP is at a high level for a horizontal scanning period during which the video signal data corresponding to the area "a" is output from the FIFO memory 36 and is at a low level for another horizontal scanning period during which the video signal data corresponding to the area "b" is output. The connecting position of the switch 44 is on the side of the 1HDL 42 when the control pulse signal CP is at the low level and is on the other side when the signal CP is at the high level. The switch 44 is thus arranged to repeatedly output twice the one-horizontal scanning amount of the video signal data corresponding to the area "a". As a result, the video signal data output from the switch 44 becomes a video signal which gives an enlarged image which is two times as large as the image of the area "a" of FIG. 5.

The enlarged image which is thus obtained can be produced in various manners. In a case where the enlarged image is to be displayed alone: The switch 34 is connected to the input side. The switch 52 is connected to the side of the multiplier 50. The coefficient data DK is set to be constantly at "1". This causes the input signal component to be offset at the adder 54. As a result, the enlarged image signal coming from the switch 44 is output from the output terminal 56.

In producing the enlarged image in a state of a still picture: Writing into the FIFO memory 36 is brought to a stop. The reading reset signal RR is set to have a pulse for every field. As a result, the switch 44 comes to repeatedly output the enlarged signal for one and the same picture. The rest of the operation is the same as in the case of outputting the enlarged image in the form of a motion picture.

In obtaining the wiping or fading effect with the input image used in combination with the enlarged image: While the switch 44 is outputting either the enlarged image of the input image or that of a still picture, the coefficient data DK supplied to the multiplier 50 is changed between "0" and "1" in synchronism with the horizontal sync signal HD and the vertical sync signal VD. This operation gives a composite video signal for a picture consisting of an enlarged image part and a motion picture part which is obtained from the input video signal. Further, if the coefficient data DK is set at "½", a composite video signal for a multiple picture which consists of an enlarged picture and a motion picture obtained from the input video signal. Further, with the change-over timing of the coefficient data DK between "0" and "1" changed with time, one picture can be changed over to another to give the wiping effect. With the value of the coefficient data DK changed with time from "0" to "1" or from "1" to "0", one picture can be changed over to another in such a way as to give the fading effect.

Figure 8A:
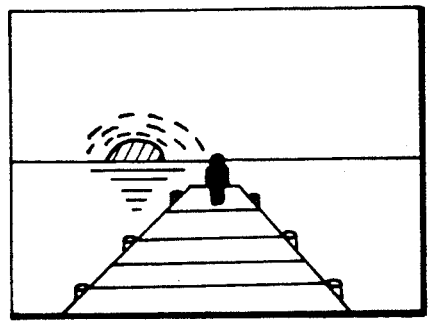
FIGS. 8(A) and 8(B) are illustrations of an example of special picture effects obtainable by the device shown in FIG. 4.
Figure 8B:
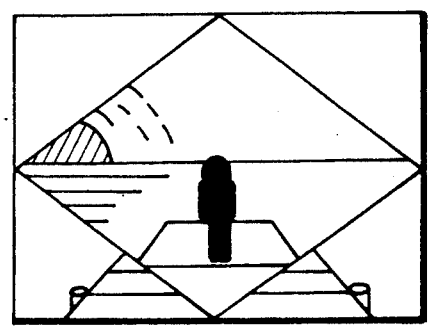

These image combining processes can be likewise accomplished irrespective as to whether the enlarged image is in the form of a still picture or in the form of a motion picture. In a case where the enlarged image is in the form of a motion picture, a normal picture can be combined with an enlarged picture to give an extremely great effect. For example, an image signal corresponding to a composite picture which is shown in FIG. 8(B) is obtainable from an input image signal corresponding to a picture which is shown in FIG. 8(A).

Further, with the switch 44 connected to the output terminal 56 for one field period in a state of outputting an enlarged image, the enlarged image can be further enlarged by stopping the process of writing into the FIFO memory 36 when the one-field period expires.

The video signal processing device arranged according to this invention as described above is capable of performing, with a simple circuit arrangement, many and varied kinds of processes including a noise reducing process, a still image producing process, an image combining process, a wipe- or fade-effect attaining process, an image enlarging process, an enlarged still image producing process, a process of combining images with an enlarged image, a process of attaining the wiping or fading effect with an enlarged image, a process of enlarging an enlarged image again, etc., without necessitating use of any additional circuit arrangement.

Further, with respect to the still image producing process, the image combining process, the wipe- or fade-effect attaining process, the image enlarging process, the process of combining images with an enlarged image, the process of attaining the wiping effect with an enlarged image and the process of attaining the fading effect with an enlarged image can be accomplished by the arrangement of a circuit portion between the FIFO memory 36 and the adder 54. Any device that includes such a circuit arrangement gives the same advantageous effect.

As described in the foregoing, the video signal processing device according to this invention is capable of giving the wiping and fading effects in combining an enlarged image with other images despite of its simple circuit arrangement.

What is claimed is:

1. A video signal processing device comprising:
   a) memory means having a memory arranged to receive a first video signal and to be capable of storing at least one picture of a video signal;
   b) subtracting means for forming a video signal representing a difference between a video signal output from said memory means and a second video signal;
   c) multiplying means arranged to receive the video signal output from said subtracting means and to multiply the video signal by a variable coefficient;
   d) adding means for adding together a video signal output from said multiplying means and said second video signal; and
   e) switching means for selectively supplying said second video signal or a video signal output from said adding means to said memory means as said first video signal.

2. A video signal processing device comprising:
   a) memory means having a memory arranged to receive a first video signal and to be capable of storing at least one picture of a video signal;
   b) subtracting means for forming a video signal representing a difference between a video signal output from said memory means and a second video signal;
   c) multiplying means arranged to receive the video signal output from said subtracting means and to multiply the video signal by a variable coefficient;
   d) adding means for adding together a video signal output from said multiplying means and said second video signal; and
   e) control means for gradually varying a coefficient to be used as a multiplier by said multiplying means and for inhibiting an operation of writing into said memory, said control means inhibiting the operation of writing when said coefficient is gradually varying between "0" and "1".

3. A device according to claim 2, further comprising a sync separation circuit arranged to operate a synchronizing signal from said second video signal, and wherein said control means gradually varies said coefficient in accordance with the timing of said synchronizing signal.

4. A video signal processing device comprising:
   a) memory means having a memory arranged to receive a first video signal and to be capable of storing at least one picture of a video signal;
   b) subtracting means for forming a video signal representing a difference between a video signal output from said memory means and a second video signal;
   c) multiplying means arranged to receive the video signal output from said subtracting means and to multiply the video signal by a variable coefficient;
   d) adding means for adding together a video signal output from said multiplying means and said second video signal; and
   e) control means for controlling a coefficient to be used as a multiplier means, said control means setting said coefficient to "0" for a first portion of the video signal output from said subtracting means corresponding to a first area of an image plane, and setting said coefficient to "1" for a second portion of the video signal output from said subtracting means corresponding to a second area of the image plane.

5. A device according to claim 4, wherein said control means is capable of gradually varying the first area and the second area.

6. A device according to claim 5, wherein said control means inhibits an operation of writing into said memory when the first area and the second area are gradually varying.

7. A video signal processing device comprising:
   a) memory means having a memory arranged to receive a first video signal and to be capable of storing at least one picture of a video signal, said memory means being arranged to be capable of selectively outputting a video signal read out from said memory or a specific video signal corresponding to a specific color;
   b) subtracting means for forming a video signal representing a difference between a video signal output from said memory means and a second video signal;
   c) multiplying means arranged to receive the video signal output from said subtracting means and to multiply the video signal by a variable coefficient; and
   d) adding means for adding together a video signal output from said multiplying means and said second video signal.

8. A video signal processing device comprising:
   a) memory means having a memory arranged to receive a first video signal and to be capable of storing at least one picture of a video signal; said memory means being arranged to supply said first video signal to said memory and to be capable of outputting from said memory a video signal corresponding to an enlarged state of an image which corresponds to said first video signal;
   b) subtracting means for forming a video signal representing a difference between a video signal output from said memory means and a second video signal;
   c) multiplying means arranged to receive the video signal output from said subtracting means and to multiply the video signal by a variable coefficient; and
   d) adding means for adding together a video signal output from said multiplying means and said second video signal.

9. A video signal processing device comprising:
   a) memory means having a memory arranged to receive a first video signal and to be capable of storing at least one picture of a video signal;
   b) subtracting means for forming a video signal representing a difference between a video signal output from said memory means and a second video signal;
   c) multiplying means arranged to receive the video signal output from said subtracting means and to multiply the video signal by a variable coefficient;
   d) adding means for adding together a video signal output from said multiplying means and said second video signal;

e) non-linear means, arranged to input the video signal output from said subtracting means, a level of an output signal of said non-linear means varying according to a level of the input signal thereof at a non-linear ratio; and f) switching means for selectively supplying said adding means with the output signal of said non-linear means or an output signal of said multiplying means.

10. A device according to claim 9, wherein a video signal output from said adding means is supplied to said memory means as said first video signal.

11. A video signal processing device comprising:
a) memory means arranged to receive a first video signal and to have a memory which is capable of storing an "n" picture of a video signal, "n" representing an integer which is at least 1;
b) subtracting means for forming a video signal representing a difference between a video signal output from said memory means and a second video signal;
c) multiplying means arranged to receive the video signal output from said subtracting means and to multiply said video signal by a variable coefficient;
d) non-linear means arranged to input the video signal output from said subtracting means, a level of an output signal of said non-linear means varying according to a level of the input signal thereof at a non-linear ratio;
e) switching means for selectively outputting a signal output from said non-linear means or a signal output from said multiplying means; and
f) adding means for adding together the video signal output from said switching means and said second video signal.

12. A device according to claim 11, wherein said second video signal is supplied to said memory means as said first video signal.

13. A device according to claim 11, wherein a video signal output from said adding means is supplied to said memory means as said first video signal.

14. A device according to claim 11, further comprising memory control means for determining whether or not a video signal is to be written into said memory and whether or not a video signal is to be read out from said memory.

15. A device according to claim 14, wherein said memory control means acts to write and read a video signal into and out of said memory; and, while said memory means is acting to delay said first video signal for a period of said "n" picture amount, said switching means outputs the video signal output from said non-linear processing means.

16. A device according to claim 11, wherein said memory means is arranged to be capable of outputting a video signal corresponding to an enlarged state of an image corresponding to said first video signal; and, while said memory means is outputting a video signal corresponding to the enlarged state of an image corresponding to said first video signal, said switching means outputs a video signal output from said multiplying means.

17. A device according to claim 11, wherein said memory means is arranged to be capable of selectively outputting a video signal read out from said memory or a specific video signal which corresponds to a specific color; and, while said memory means is outputting the video signal read out from said memory and said specific video signal corresponding to said specific color by switching said video signals from one over to the other within one picture period, said switching means outputs a video signal output from said multiplying means.

18. A video signal processing device comprising:
a) memory means including a memory which is capable of storing at least one picture of a video signal;
b) subtracting means for forming a video signal representing a difference between a video signal output from said memory means and an input video signal;
c) multiplying means arranged to receive the video signal output from said subtracting means and to multiply said video signal by a variable coefficient;
d) adding means for adding together a video signal output from said multiplying means and said input video signal; and
e) selecting means for selectively supplying said memory means either with said input video signal or with a video signal output from said adding means.

19. A device according to claim 18, further comprising:
non-linear means arranged to input the video signal output from said subtracting means, a level of an output signal of said non-linear means varying according to a level of an input signal thereof at a non-linear ratio;
switching means for selectively supplying said adding means either with a signal output from said non-linear means or with the signal output from said multiplying means;
memory control means for determining whether or not a video signal is to be written into said memory; and
interlocking means for interlocking said memory control means with said switching means.

* * * * *

UNITED STATES PATENT AND TRADEMARK OFFICE
CERTIFICATE OF CORRECTION

PATENT NO. : 5,146,334
DATED : September 8, 1992
INVENTOR(S) : Tsutomu Fukatsu, et. al.

It is certified that error appears in the above-indentified patent and that said Letters Patent is hereby corrected as shown below:

On the Title page, item [57], col. 2, line 4, change "input" to -- output --

Column 11, line 48, change "operate" to -- separate --

Signed and Sealed this

Ninth Day of November, 1993

Attest:

BRUCE LEHMAN

*Attesting Officer*       *Commissioner of Patents and Trademarks*